US009122492B2

(12) United States Patent  (10) Patent No.: US 9,122,492 B2
Salzman  (45) Date of Patent: Sep. 1, 2015

(54) BIOS USED IN GAMING MACHINE SUPPORTING PLURALATIES OF MODULES BY UTILIZING SUBROUTINES OF THE BIOS CODE

(75) Inventor: Scot W. Salzman, Buffalo Grove, IL (US)

(73) Assignee: WMS Gaming, Inc., Waukegan, IL (US)

( * ) Notice: Subject to any disclaimer, the term of this patent is extended or adjusted under 35 U.S.C. 154(b) by 734 days.

(21) Appl. No.: 13/280,930

(22) Filed: Oct. 25, 2011

(65) Prior Publication Data

US 2012/0208633 A1   Aug. 16, 2012

Related U.S. Application Data

(60) Provisional application No. 61/481,566, filed on May 2, 2011, provisional application No. 61/406,462, filed on Oct. 25, 2010.

(51) Int. Cl.
  *G06F 9/44* (2006.01)
  *G06F 21/57* (2013.01)
  *G06F 21/64* (2013.01)

(52) U.S. Cl.
  CPC ............ *G06F 9/4401* (2013.01); *G06F 21/572* (2013.01); *G06F 21/575* (2013.01); *G06F 21/64* (2013.01)

(58) Field of Classification Search
  CPC ... G06F 9/4401; G06F 9/4411; G06F 9/4404; G06F 9/4406; G06F 9/44505
  USPC ......................................................... 713/2, 1
  See application file for complete search history.

(56) References Cited

U.S. PATENT DOCUMENTS 5,701,478 A    12/1997  Chen
5,892,943 A *   4/1999  Rockford et al. ................. 713/2
(Continued)

FOREIGN PATENT DOCUMENTS

EP       1665038        1/2008
EP       1962221        8/2008
(Continued)

OTHER PUBLICATIONS

Jainandunsing et al., "COM Express the Next Big Trend in Embedded Computing Small Form Factors", Sep. 9, 2004.*

(Continued)

*Primary Examiner* — Thomas Lee
*Assistant Examiner* — Santosh R Poudel
(74) *Attorney, Agent, or Firm* — DeLizio Law, PLLC (57) ABSTRACT

Embodiments include a method for configuring basic input/output system (BIOS) of a wagering game machine. The method can include: initializing a processor and chipset residing on an embedded computer module residing in the wagering game machine, wherein the BIOS resides on a carrier board connected to the embedded computer module; identifying, under control of code in the BIOS, the embedded computer module as a particular one of a plurality of embedded computer modules, wherein the BIOS includes code for configuring each of the plurality of embedded computer modules; initializing, using code of the BIOS configured for the particular one of the plurality of embedded computer modules, input/output devices connected to the carrier board and embedded computer module; launching, under control of the BIOS, an operating system in the wagering game machine; presenting a wagering game on the wagering game machine, wherein the presenting utilizes information received from the input/output devices.

20 Claims, 7 Drawing Sheets

(56) References Cited

U.S. PATENT DOCUMENTS

| | | | |
|---|---|---|---|
| 6,029,046 A | | 2/2000 | Khan et al. |
| 6,161,177 A * | | 12/2000 | Anderson .......................... 713/2 |
| 6,658,562 B1 * | | 12/2003 | Bonomo et al. ................... 713/1 |
| 6,816,974 B1 * | | 11/2004 | Nurmi et al. ..................... 726/16 |
| 7,000,101 B2 * | | 2/2006 | Wu et al. .......................... 713/1 |
| 7,108,605 B2 | | 9/2006 | LeMay et al. |
| 7,318,173 B1 * | | 1/2008 | Falik et al. ...................... 714/36 |
| 7,366,922 B2 | | 4/2008 | Takeda et al. |
| 7,464,256 B2 | | 12/2008 | Muir |
| 7,475,238 B1 * | | 1/2009 | Yakovlev ...................... 713/100 |
| 8,001,369 B2 * | | 8/2011 | Takeda .............................. 713/2 |
| 8,166,308 B2 | | 4/2012 | Smith et al. |
| 8,392,697 B1 * | | 3/2013 | Natarajan ......................... 713/2 |
| 8,425,332 B2 * | | 4/2013 | Walker et al. ................... 463/43 |
| 8,656,148 B2 * | | 2/2014 | Lee ................................... 713/2 |
| 2002/0174353 A1 * | | 11/2002 | Lee ................................ 713/193 |
| 2003/0061603 A1 * | | 3/2003 | Tang .............................. 717/168 |
| 2004/0205364 A1 | | 10/2004 | Lai |
| 2004/0260917 A1 * | | 12/2004 | Edrich ............................... 713/1 |
| 2005/0050339 A1 * | | 3/2005 | Himmel et al. ............... 713/189 |
| 2005/0111664 A1 | | 5/2005 | Ritz et al. |
| 2005/0125652 A1 * | | 6/2005 | Singer et al. ...................... 713/2 |
| 2005/0143177 A1 | | 6/2005 | Takeda et al. |
| 2005/0177710 A1 * | | 8/2005 | Rothman et al. .................. 713/2 |
| 2006/0010317 A1 * | | 1/2006 | Lee ................................... 713/2 |
| 2006/0046855 A1 | | 3/2006 | Nguyen et al. |
| 2006/0100010 A1 | | 5/2006 | Gatto et al. |
| 2006/0156008 A1 * | | 7/2006 | Frank ............................. 713/176 |
| 2006/0160626 A1 | | 7/2006 | Gatto et al. |
| 2006/0294349 A1 | | 12/2006 | Spottswood |
| 2007/0150937 A1 | | 6/2007 | Gatto et al. |
| 2007/0186091 A1 * | | 8/2007 | Yang et al. ........................ 713/2 |
| 2007/0234031 A1 * | | 10/2007 | Garney ............................. 713/2 |
| 2008/0005553 A1 * | | 1/2008 | Wang ................................ 713/2 |
| 2008/0028235 A1 | | 1/2008 | Smith et al. |
| 2008/0172557 A1 | | 7/2008 | Crowder et al. |
| 2008/0287199 A1 | | 11/2008 | Macika et al. |
| 2008/0300043 A1 * | | 12/2008 | Sakuma .......................... 463/20 |
| 2009/0013166 A1 | | 1/2009 | Crowder, Jr. et al. |
| 2009/0089571 A1 * | | 4/2009 | Fu ..................................... 713/2 |
| 2009/0182995 A1 | | 7/2009 | Muir |
| 2010/0056255 A1 * | | 3/2010 | Yoshizawa ...................... 463/20 |
| 2010/0062844 A1 * | | 3/2010 | Crowder et al. ................ 463/29 |
| 2010/0064031 A1 | | 3/2010 | Wright et al. |
| 2010/0088547 A1 * | | 4/2010 | Chang ............................. 714/36 |
| 2010/0106956 A1 * | | 4/2010 | Guo et al. ......................... 713/2 |
| 2010/0169629 A1 * | | 7/2010 | Zhang et al. ...................... 713/1 |
| 2010/0178977 A1 | | 7/2010 | Kim et al. |
| 2010/0217992 A1 * | | 8/2010 | Hamlin et al. ................ 713/176 |
| 2011/0029766 A1 * | | 2/2011 | Sever et al. ....................... 713/2 |
| 2011/0113225 A1 * | | 5/2011 | Lu et al. ............................ 713/1 |
| 2011/0117984 A1 * | | 5/2011 | Shimabukuro et al. .......... 463/16 |
| 2011/0119474 A1 | | 5/2011 | Singh et al. |
| 2011/0131401 A1 * | | 6/2011 | Singh et al. ....................... 713/2 |
| 2012/0208619 A1 | | 8/2012 | Canterbury et al. |

FOREIGN PATENT DOCUMENTS

| | | |
|---|---|---|
| EP | 2044546 | 4/2009 |
| WO | 2005026951 | 3/2005 |
| WO | 2005081122 | 9/2005 |
| WO | 2008009112 | 1/2008 |
| WO | 2008054134 | 5/2008 |

OTHER PUBLICATIONS

Intel, "Datasheet", *Intel Core i5-600, i3-500 Desktop Processor Series, Intel Pentium Processor G6950* vol. 1 Aug. 2010, 104 pages.

Intel, "Datasheet", *Intel Core i7-800 and i5-700 Desktop Processor Series* vol. 1 Jul. 2010, 94 pages.

Intel, "Datasheet", *Intel Core i7-900 Desktop Processor Extreme Edition Series and Intel Core i7-900 Desktop Processor Series* vol. 1 Feb. 2010, 96 pages.

Intel, "Datasheet", *Intel Core i7-800 and i5-700 Desktop Processor Series* vol. 2 Sep. 2009, 300 pages.

Intel, "Datasheet", *Intel Core i5-600, i3-500 Desktop Processor Series and Intel Pentium Processor G6950* vol. 2 Jan. 2010, 366 pages.

Intel, "Datasheet", *Intel Core i7-900 Desktop Processor Extreme Edition Series and Intel Core i7-900 Desktop Processor Series* vol. 2 Oct. 2009, 98 pages.

U.S. Appl. No. 13/280,964, filed Oct. 25, 2011, Canterbury, Stephen A., et al.

Intel, "Thermal and Mechanical Design Guide", *Intel Core i7-900 Desktop Processor Extreme Edition Series and Intel Core i7-900 Desktop and Intel Core i7-900 Desktop Processor Series and LGA1366 Socket* Mar. 2010, 68 pages.

Intel, "Thermal/Mechanical Specifications and Design Guidelines", *Intel Core i7-800 and i5-700 Desktop Processor Series and LGA1156 Socket* Sep. 2009, 102 pages.

Intel, "Thermal/Mechanical Specifications and Design Guidelines", *Intel Core i5-600, i3-500 Desktop Processor Series, Intel Pentium Processor G6950 and LGA1156 Socket* Jan. 2010, 108 pages.

"U.S. Appl. No. 13/280,964 Office Action", Apr. 8, 2014, 17 Pages.

\* cited by examiner

BIOS USED IN GAMING MACHINE SUPPORTING PLURALATIES OF MODULES BY UTILIZING SUBROUTINES OF THE BIOS CODE

RELATED APPLICATIONS

This application claims the priority benefit of U.S. Provisional Application Ser. No. 61/481,566 filed May 2, 2011.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to computer systems, and more particularly to wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator.

Because wager gaming involves large monetary sums, the industry is heavily regulated by government agencies and the like. Regulators attempt to keep wager gaming fair, and protect the public and casinos from cheating. In some regulatory jurisdictions, regulators perform verification testing on wagering game machine components. For example, regulators may examine (e.g., in the field) a machine's Basic Input/Output System (BIOS) to ensure that it has not been modified since receiving regulatory approval. Modified BIOS code may perform rogue operations that facilitate cheating. As a result, regulators may confiscate or otherwise deactivate machines that have been modified.

Some wagering game machines take additional measures to ensure that no components have been modified. Some wagering game machines establish a chain of trust for all code being executed on the machine. The machines can include processors, chipsets, nonvolatile memory storing BIOS, etc. The BIOS includes code executed as part of the wagering game machine's boot-up process. In wager gaming environments, the BIOS code may be stored in write-protected nonvolatile memory to prevent the code from being modified, deleted, etc.

This nonvolatile memory containing the BIOS code typically resides on a carrier board (also known as a motherboard, system printed circuit board, baseboard, main board, etc.). In some instances, the nonvolatile memory (including the BIOS code) resides in a socket on the carrier board. The nonvolatile memory can be removed from the socket for independent authentication of its contents (e.g., BIOS code). For example, the nonvolatile memory can be placed in a trusted verification device for verification (e.g., verification devices can include devices manufactured by Kobetron Inc. of Navarre, Fla., Gaming Laboratories International Inc. (GLI) of Toms River, N.J., Dataman Programmer Ltd. of Orange City, Fla., etc.). The trusted verification device can then produce a digital signature based on the data that is stored therein. This device can compare the digital signature to a known valid digital signature. Once authenticated, the BIOS code is the beginning of a chain of trust.

This authentication by a trusted verification device can occur at different times. For example, regulators can perform authentication when the wagering game machine is initially installed, at different times in the field, etc. Thus, regulators may manually remove the nonvolatile memory to authenticate the BIOS. In another example, this authentication can be required after a certain level of win—a big win. A big win can be defined relative to any monetary amount and can vary between different types of wagering game machines. For example, a big win on wagering game machine A can be $10,000, and a big win on wagering game machine B can be $25,000. An authentication after a big win can help ensure that no person or program has tampered with or altered this chain of trust in the wagering game machine to illegally obtain the win.

As noted, some gaming regulations call for authentication of BIOS code. As the number of different wagering game machine component configurations increases, so increases the number of BIOS configurations. If the BIOS and its associated digital signatures were different for every different component configuration, the authentication process would be cumbersome and slow, as regulators would need to look up unique digital signatures for each different configuration.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes example component architectures. The third section describes example operations performed by some embodiments and the fourth section describes example wagering game machines in more detail. The fifth section presents some general comments.

Introduction

This section provides an introduction to some embodiments of the inventive subject matter.

Typically, BIOS includes code for a particular component combination, such as a combination of a central processing unit (CPU), chipset, COM Express module, peripherals, etc. BIOS for one component combination will not typically work for a different combination. For example, BIOS developed for an Intel® processor, Intel chipset, and an Advantech COM Express module will not work for the same Intel processor and chipset coupled with a ADLink COM Express (COMe) module. One reason for this incompatibility is that different component combinations may operate differently. For example, COMe module's peripherals may differ from those of another COMe module.

In some instances, a portion of BIOS is developed for a processor and chipset, while another portion of the BIOS is developed for the COMe module and its peripherals. Accordingly, a BIOS maker may develop BIOS code for controlling the processor and chipset, while the COMe module manufacturer develops the BIOS code for controlling the COMe module and its peripherals.

Some embodiments of the inventive subject matter include a BIOS capable of supporting a plurality of different COMe modules. That is, some embodiments include a BIOS portion for controlling a particular processor and chipset, and another BIOS portion capable of controlling a plurality of different COMe modules and peripherals. Some embodiments can identify which of a plurality of COMe modules are present, and then configure and control the COMe module. To facilitate the identification, some embodiments include a memory device including information identifying the COMe module. After reading the information identifying the COMe module, the BIOS can utilize code for initializing and controlling that particular COMe module.

In some embodiments, the BIOS does not simply select between different independent components, where each is tailored to control one particular COMe module (or other components). Instead, some embodiments include a unitary BIOS that supports a processor, chipset, and a group of different components (e.g., different COMe boards, different carrier boards, etc.), where the BIOS includes in-line code capable supporting a particular processor and chipset and various components (e.g., different COMe boards, different carrier boards, etc.). For example, embodiments of the BIOS may include code for controlling a particular processor and chipset, and in-line conditional instruction statements (e.g., case statements) capable of selecting code appropriate to the components residing in the system.

In some instances, the BIOS maker collects code from the different COMe module makers. Thus, the BIOS can include code for controlling a plurality of different COMe modules, as well as code for controlling a processor and chipset. The BIOS maker may add code that identifies which of the plurality of different COMe modules resides in the system, and code that utilizes the code for the appropriate COMe module. As such, according to some embodiments, the BIOS maker can create a unitary BIOS capable of controlling any one of a plurality of COMe modules.

As noted above, some gaming regulations call for authentication of BIOS code. As the number of component configurations increases, so increases the number of BIOS configurations. If the BIOS and its associated digital signatures were different for different component configurations, the authentication process would be cumbersome and slow, as regulators would have to look up unique digital signatures for each different component combination. According to some embodiments, a single BIOS and its associated digital signatures are the same for a plurality of different component combinations. As a result, regulators can use the same digital signature to authenticate BIOS for numerous different wagering game machines having different component combinations (e.g., different COMe modules and peripherals).

Operating Environment

This section describes an example operating environment and presents structural aspects of some embodiments. This section includes discussion about components (e.g., BIOS) and arrangements of the components.

Component Architectures

This section describes structural aspects of some embodiments.

Figure 1:
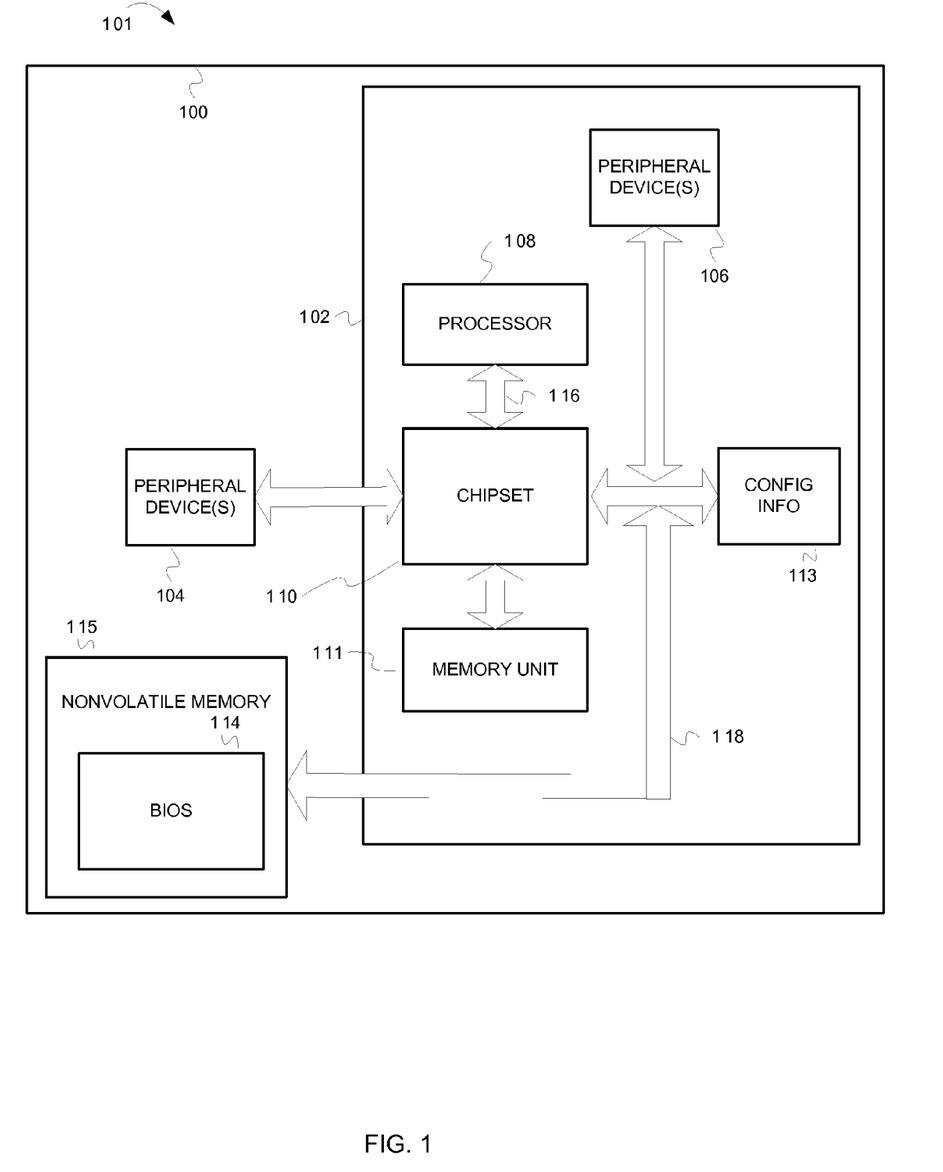
FIG. 1 is a block diagram illustrating a system including BIOS capable of supporting different COMe modules.

FIG. 1 is a block diagram illustrating a system including BIOS capable of supporting different COMe modules. Some embodiments of the system reside in a wagering game machine. In FIG. 1, the system 101 includes a carrier board 100. The carrier board 100 is also known as a motherboard, system printed circuit board, baseboard, main board, etc. A number of different components can be located on the carrier board 100. In this example embodiment, an embedded computer module 102 is located on the carrier board 100. In some example embodiments, the embedded computer module 102 is compliant with a COM (Computer-On-Module) Express industry standard, issued by PICMG (PCI Industrial Computer Manufacturers Group). COM Express (COMe) can be based on several serial differential-signaling technologies, including PCI Express, Serial Advanced Technology Attachment (SATA), USB 2.0, and Serial Digital Video Out (SDVO).

In some example embodiments, the embedded computer module 102 is compliant with an ETX (Embedded Technology eXtended) Express COM specification. ETX is a PCI/ISA based COM, which offers personal computer (PC) functionality. The embedded computer module 102 can include one or more peripheral devices 106 that provide video functionality, audio functionality, network connectivity, communication interfaces, etc.

The embedded computer module 102 can host one or more processors. In FIG. 1, the embedded computer module 102 includes a processor 108. The processor 108 can include any suitable processor, such as an Intel® Core™ i3 processor, an Intel® Core™ i5 processor, an Intel® Core™ i7 processor, or other suitable processors.

The embedded computer module 102 also includes a chipset 110. The chipset 110 can be one or more chips to provide an interface to the processor 108. In this example, the chipset 110 is communicatively coupled to the processor 108 through a bus 116 (e.g., front side bus). The chipset 110 can provide an interface to the processor 108 for main memory, graphics controllers, peripheral buses (e.g., Serial Peripheral Interface (SPI), Peripheral Component Interconnect (PCI), Industry Standard Architecture (ISA), Universal Serial Bus (USB), etc.), etc. In this example, a memory unit 111 resides on the embedded computer module 102. The memory unit 111 can include any suitable memory device, such as volatile Random Access Memory (RAM) (e.g., Dynamic RAM (DRAM), Static RAM (SRAM), etc.). The memory unit 111 can also include nonvolatile memory, such as flash memory devices.

As shown, BIOS 114 resides in a nonvolatile memory device 115 on the carrier board 100. The device 115 can communicate with the chipset 110 over any suitable communication channel, such as a Serial Peripheral Interface (SPI) bus. The BIOS 114 can utilize configuration information 113, which resides in a nonvolatile memory device on the embedded computer module 102. The configuration information 113 includes information identifying components resident in the system 100. Code within the BIOS 114 can use the configuration information 113 to identify which of a plurality COMe modules, carrier boards, or other embedded computer modules is resident in the system 101. In some instances, the configuration information 113 is recorded into the memory device 115 as part of a process for manufacturing the embedded computer module 102. After identifying the resident components (e.g., identifying a COMe module as being a particular make and model), the BIOS 114 can select code appropriate for initializing and controlling the resident components. The BIOS code can initialize numerous devices in the system 101, such as the processor 108, chipset 110, peripheral devices 106 (e.g., video display adapters, keyboards, pointing devices, hard disks, network interfaces) and other devices (e.g., devices that facilitate wager gaming, such as bill validators, etc.). After initializing various devices, the BIOS 114 can load and execute an operating system that takes control of the system 101.

Although not shown, the carrier board 100 and the embedded computer module 102 can include other components. For example, the embedded computer module 102 can include cache, a memory controller, an I/O controller, connectors, etc. For example, the embedded computer module 102 can provide external connections for one or more PCI Express lanes, PCI Express Graphics (PEG) links, SATA links, Integrated Drive Electronics (IDE) or Parallel Advanced Technology Attachment (PATA) links, multiple Gigabit (Gbit) Ethernet ports (e.g., including 1-Gbps Ethernet and/or 10-Gbps Ethernet), USB 2.0 ports, low-voltage differential signaling (LVDS) channels, high-definition audio interfaces, channels of SDVO, analog cathode ray tube (CRT) interfaces, analog VGA interfaces, NSTC/PAL, TV-out ports (e.g., SDTV and/or HDTV), SMP and I2C busses, and power and ground I/O, among other things.

Figure 2:
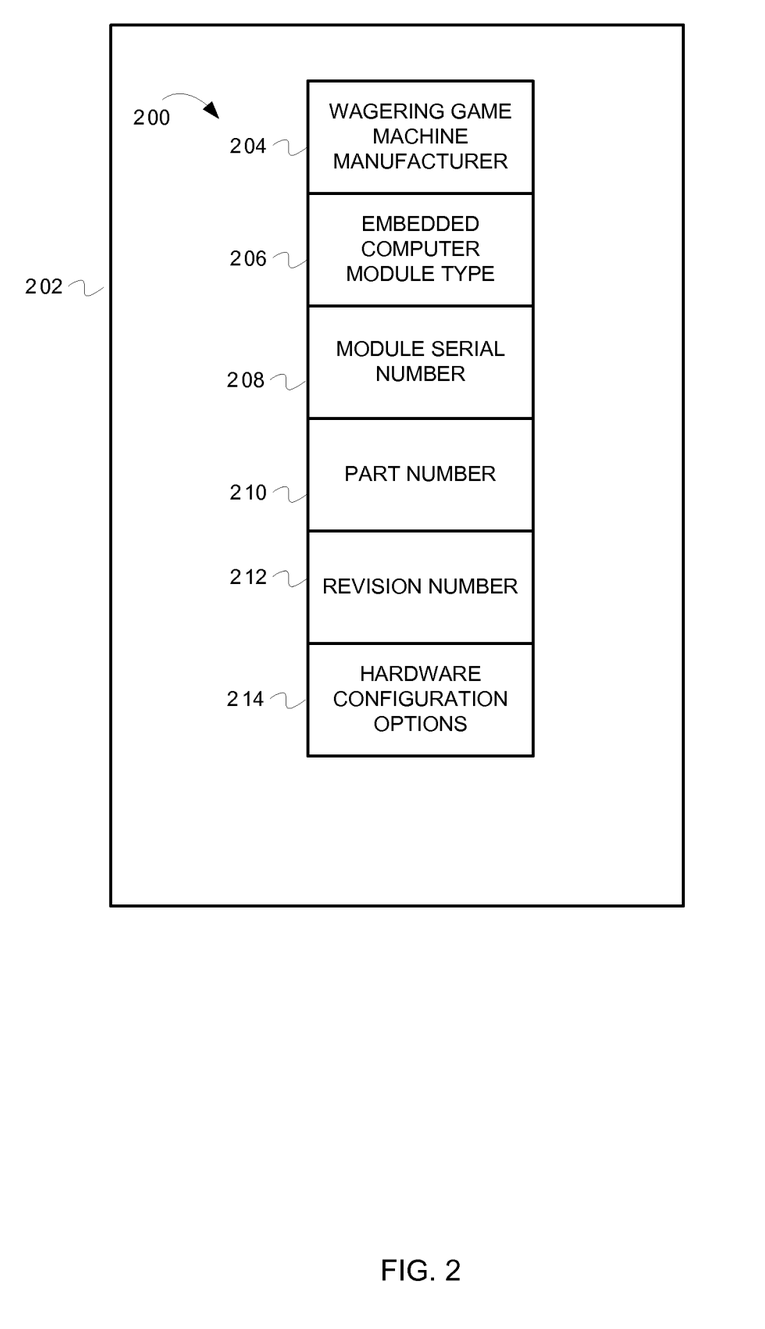
FIG. 2 shows an embodiment of the configuration information.

FIG. 2 shows an embodiment of the configuration information. In FIG. 2, the configuration information 200 resides in a memory device 202. The memory device can be any suitable nonvolatile memory device, such as any suitable electrically erasable programmable read only memory (EEPROM) device. The memory device 202 and configuration information 200 can reside on an embedded computer module (e.g., as shown in FIG. 1), or they can reside on a carrier board.

The configuration information 200 includes a wagering game machine manufacturer field 204, embedded computer module type field 206, module serial number field 208, part number field 210, and revision number field 212. The wagering game machine manufacturer field 204 can identify a manufacturer of a wagering game machine in which the configuration information resides. The embedded computer module type field 206 can indicate a type for the imbedded computer module. For example, the field 206 can indicate whether the embedded computer module is a COMe module, an ATFlex module, or some other module type.

The module serial number field 208 can indicate a vendor-specific serial number for the embedded computer module. The part number field 210 can indicate a vendor-specific part number for the embedded computer module. The revision number field 212 can indicate a vendor-specific revision number for the embedded computer module.

The hardware configuration options field 214 can indicate which of a plurality of components reside in a system. For example, the hardware configuration options field may include an option code (e.g., "option 1", "option 2", etc.) indicating a particular one of a plurality of COMe modules resides in the system. In some instances option codes are associated with predetermined configurations (e.g., an option code can indicate a particular make and model of COMe module). Alternatively, the field 214 may indicate certain peripherals residing on a carrier board, an embedded computer module, etc. In some embodiments, BIOS code determines which of a plurality of embedded computer modules resides in the system. In turn, the BIOS code initializes and controls the resident module using code appropriate to the resident module.

This description continues with a discussion of more configuration techniques.

In traditional desktop environments, users can readily configure BIOS options via user input. For example, users can provide input (e.g., via keyboard, mouse, etc.) for selecting boot devices, display options, memory options, etc. BIOS may store the user selections as local configuration data (e.g., in BIOS 314 of FIG. 3), and use the configuration data for configuring BIOS. Going forward, upon power-up, BIOS may configure itself according to the local configuration data. As described above, wager gaming environments are heavily regulated and call for heightened security. To increase security, some wagering game machines do not provide any facility by which users can configure BIOS options. That is, some wagering game machines do not allow technicians to provide user input (e.g., via keyboard, mouse, etc.) for configuring user-selectable BIOS options. As such, in some wager gaming environments, technicians cannot change a wagering game machine's user-selectable BIOS options in the field.

Figure 3:
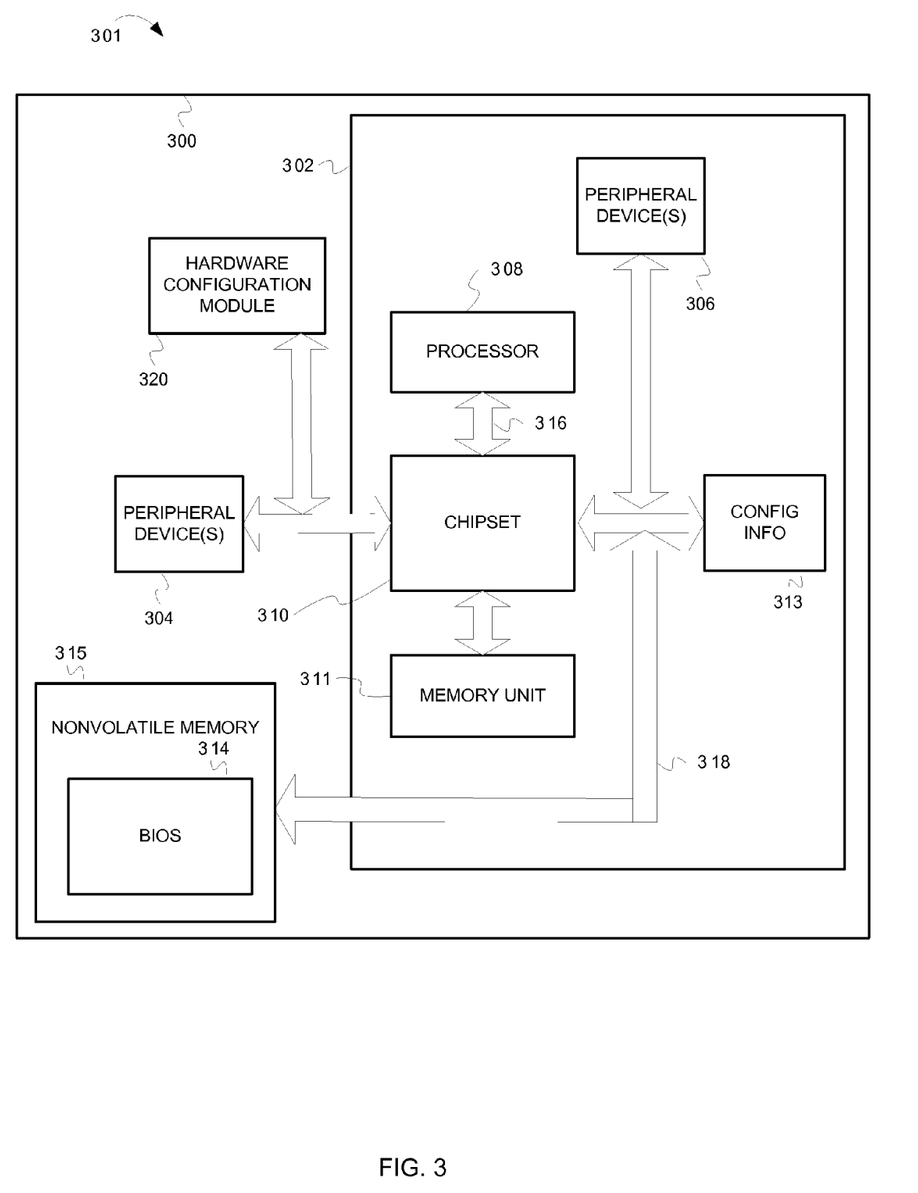
FIG. 3 is a block diagram illustrating a system capable of using hardware-based input for configuring BIOS, according to some embodiments of the invention.

Some embodiments of the inventive subject matter enable technicians to configure BIOS by adjusting hardware components in the system. FIG. 3 describes how some embodiments can use hardware components to achieve BIOS configuration.

FIG. 3 is a block diagram illustrating a system capable of using hardware-based input for configuring BIOS, according to some embodiments of the invention. In FIG. 3, the system 301 includes all the components shown in FIG. 2. The system 301 also includes a hardware configuration module 320. The hardware configuration module 320 is a hardware device used for configuring user-selectable BIOS options.

In some systems, BIOS allows users to select various user-selectable BIOS options (e.g., using a keyboard or mouse). Such a BIOS saves the selections for future boot-ups. However, in some embodiments, the BIOS 314 cannot be modified. Thus, for such embodiments, user-selectable BIOS options are not available, and will not be saved in the BIOS 314. That is, users cannot enter input for user-selectable BIOS options, such as boot devices, display options, etc. Although the BIOS 314 will not receive and save user-selectable options via user input (via keyboard, mouse, etc.), technicians can use the hardware configuration module 320 to set certain BIOS configuration options. In some embodiments, the hardware configuration module 320 tests for presence of a hardware strap (e.g., switch, 2 pin header with shunt, etc.). Presence of the hardware strap indicates a desire for certain BIOS options, such as selection of primary and secondary display adapters, boot device selection, network adapter settings, or any other suitable BIOS configuration options. Based on the test (e.g., presence of the hardware strap), the module 320 produces an indication detectable by the BIOS 314. The BIOS 314 includes code for detecting the indication of options. In some embodiments, the hardware configuration module 320 transmits a signal to the processor 308, where BIOS code detects the signal and modifies the BIOS options accordingly. In some instances, presence/absence of the hardware strap indicates a group of one or more BIOS options.

In some embodiments, presence of a hardware strap grounds a port in the hardware configuration module 320, allowing BIOS 314 to detect a low signal. If the strap is not present, the port is not grounded, and the BIOS 314 detects a high signal.

As noted above, some embodiments of the BIOS 314 are immutable. Thus, even if the hardware configuration module 320 indicates a desire for certain BIOS options, the BIOS 314 will not change. That is, the BIOS 314 will not store, for use in future initialization (i.e., power-ups), information indicating a selection of BIOS options. For example, if a hardware strap is absent, the BIOS 314 initializes to default settings; otherwise, the BIOS 314 initializes to settings associated with the strap, but does not save data indicating that such settings should be used in the future.

The following is an example is a "use case" involving the hardware configuration module 320. As a default, the BIOS 314 may support only two video display adapters. However, the hardware configuration modules 320 can configure the BIOS 314 to support three video display adapters, where the third adapter acts as the primary adapter (e.g., the adapter on which the power-on information appears). If the BIOS 314 detects (from module 320) an indication to support three video display adapters, the BIOS 314 will enable three video display adapters, where the third adapter is the primary adapter. Such a video configuration may be useful when adding an overhead sign to a wagering game machine. Without the overhead sign, the wagering game machine may need only two displays (e.g., a first display adapter for showing a primary wagering game, and a second adapter for showing a bonus game). If technicians want to add an overhead sign, they can configure the hardware configuration module 320 to send a signal enabling the new video configuration (e.g., by adding a hardware strap). As a result, the wagering game machine supports multiple video configurations without changing any code in its BIOS.

Figure 4:
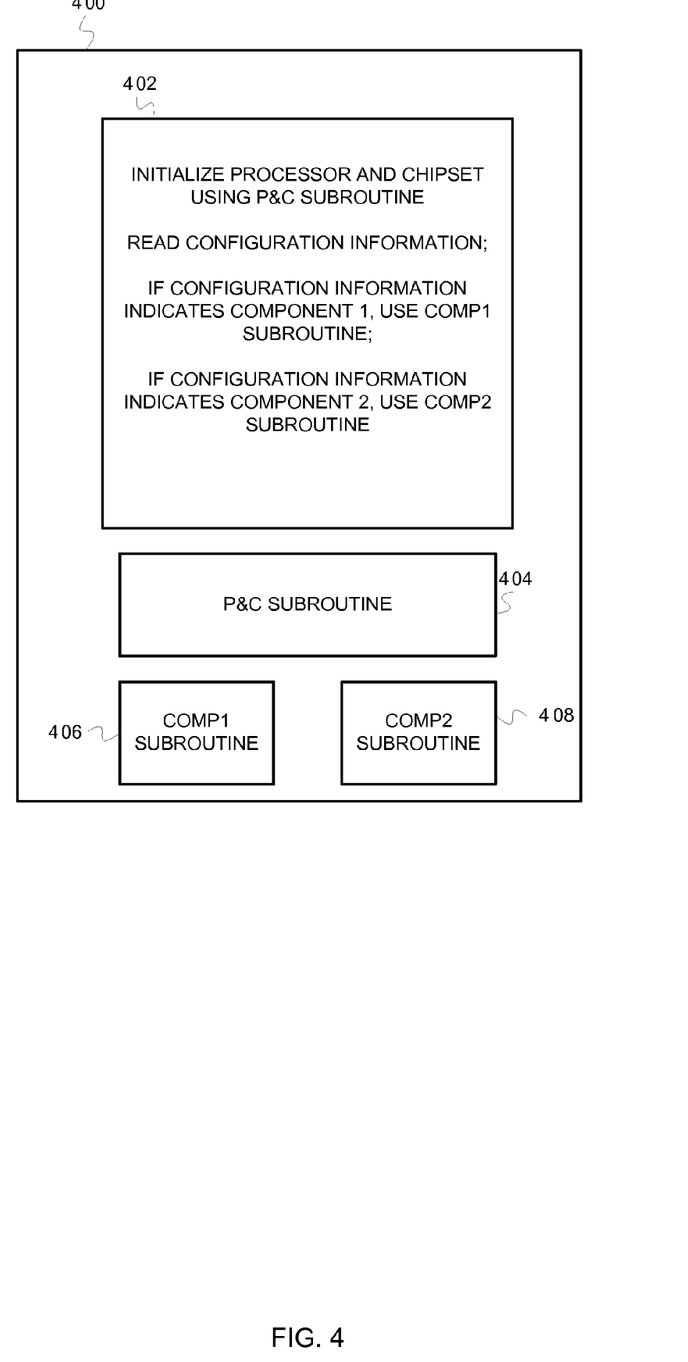
FIG. 4 is a block diagram illustrating a BIOS, according to some embodiments of the invention.

FIG. 4 is a block diagram illustrating a BIOS, according to some embodiments of the invention. In FIG. 4, the BIOS 400 is a unitary component including logic for initializing any one of a plurality of components. The BIOS includes subroutines 402, 404, 406, and 408. When executed, the subroutine 402 calls subroutine 404 to initialize a processor and chipset. As the subroutine 402 continues executing, it can read configuration information (e.g., 202) to determine what components are present in the system. In turn, the subroutine 402 can call a subroutine that can initialize the components in the system. For example, if the configuration information indicates a particular COMe module (or any other component, such as the carrier board), the BIOS 400 calls one of plurality of subroutines that can initialize that component (where the other subroutines can initialize different components of the same type, such as a COMe module of a different make and model). As such, some embodiments include a single BIOS that can operate with any one of a plurality of components.

Embodiments of the inventive subject matter can include one or more computer readable mediums. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, etc. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Example Operations

This section describes operations associated with some embodiments of the invention. In the discussion below, the flow diagrams will be described with reference to the block diagrams presented above. However, in some embodiments, the operations can be performed by components not described in the block diagrams.

In certain embodiments, the operations can be performed by executing instructions residing on computer-readable media (e.g., software), while in other embodiments, the operations can be performed by hardware and/or other components (e.g., firmware). In some embodiments, the operations can be performed in series, while in other embodiments, one or more of the operations can be performed in parallel. Moreover, some embodiments can perform less than all the operations shown in any flow diagram.

Figure 5:
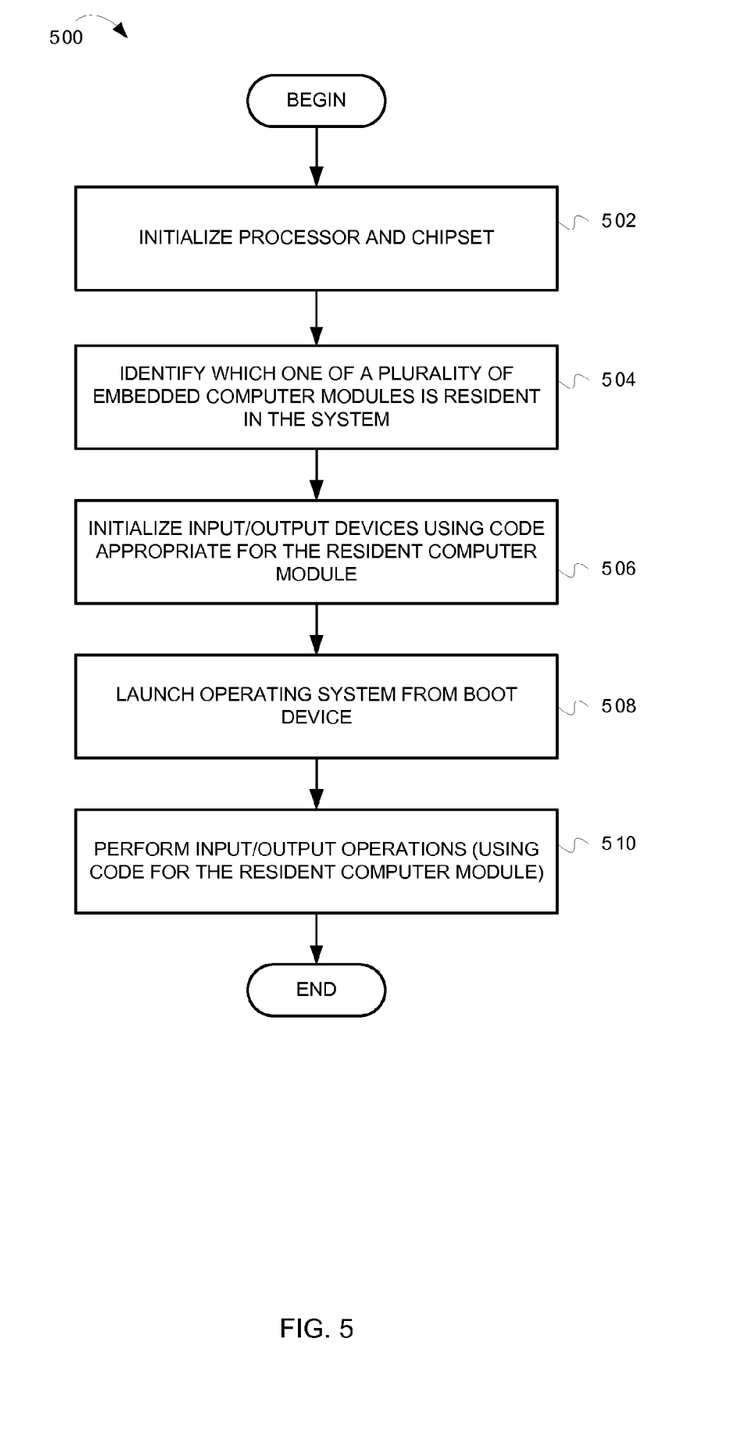
FIG. 5 is a flow diagram illustrating operations for initializing a computer system, according to some embodiments of the invention.
Figure 6:
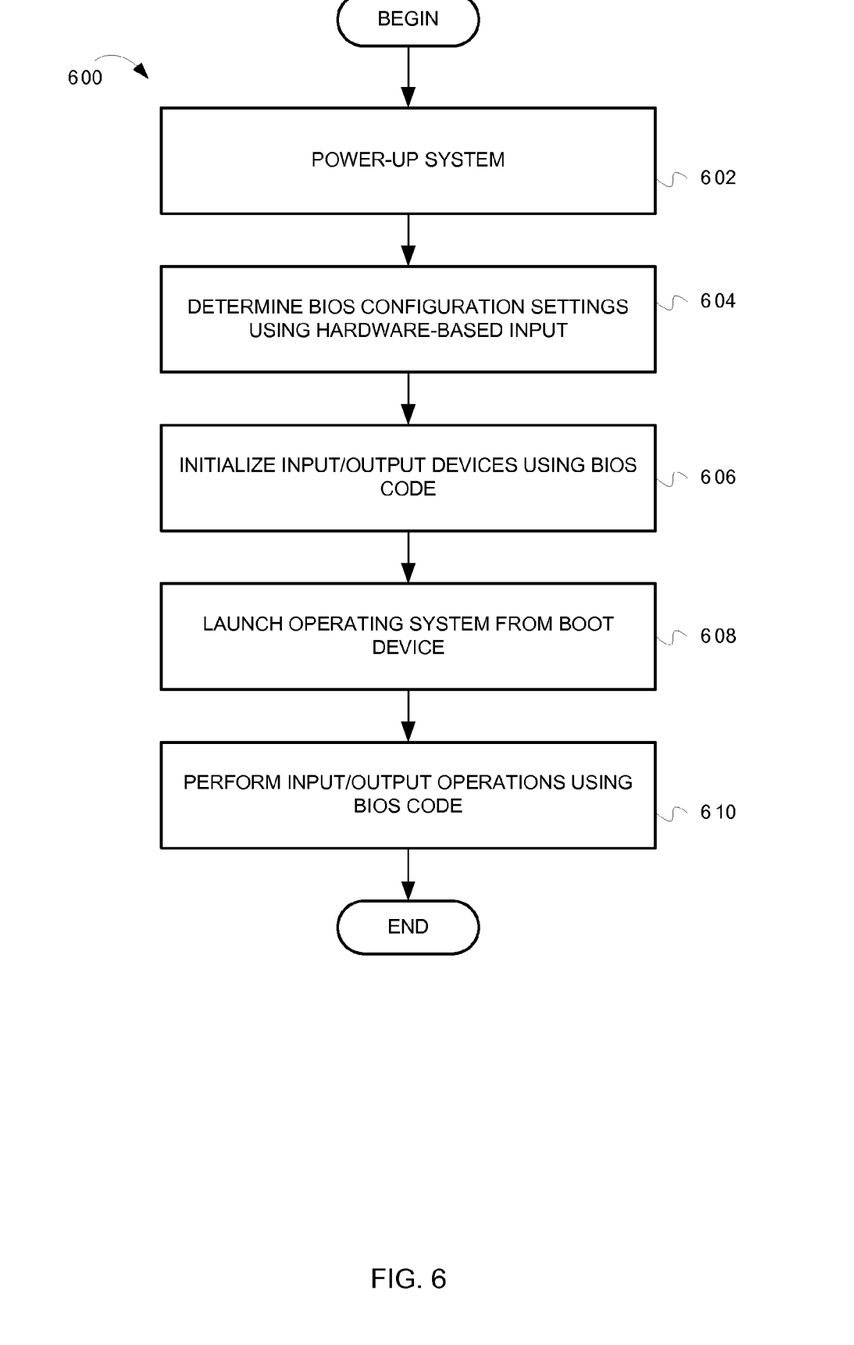
FIG. 6 is a flow diagram illustrating operations for detecting BIOS configuration options, according to some embodiments of the inventive subject matter.

The section will discuss FIGS. 5 and 6.

FIG. 5 is a flow diagram illustrating operations for initializing a computer system, according to some embodiments of the invention. In some embodiments, the computer system is part of a wagering game machine.

In FIG. 5, a flow 500 begins at block 502, where the wagering game initializes a processor and chipset. In some embodiments, a portion of the wagering game machine's BIOS (e.g., see 114) is configured to initialize a processor and chipset. From block 502, the flow continues at block 504.

At block 504, BIOS identifies which one of the plurality of embedded computer modules is resident in the computer system. For example, referring to FIG. 1, the BIOS 114 (while executing on the processor 108) may read the configuration information 113. The configuration information can include a hardware configuration options field (e.g., see 214) indicating which of a plurality of COMe modules (or other embedded computer modules) resides in the system. For example, BIOS 114 may include code for controlling a number of different COMe modules from different manufacturers. The hardware configuration options field tells BIOS 114 which of the COMe module is resident. In response, the BIOS 114 can utilize code appropriate for the resident module (and not other modules) to initialize the resident module and its peripherals. The flow continues at block 506.

At block 506, the BIOS initializes input output devices, such as user input devices, video devices, audio devices, media drives, etc. Based on the operation at block 404, the BIOS uses the appropriate code for initializing devices resident in the system. The flow continues at block 508.

At block 508, after initializing the I/O devices, the system launches an operating system from a boot device. For example, under control of the BIOS 114, the processor 108 begins loading and executing an operating system from a boot device indicated in configuration options stored locally in the BIOS 114. From block 408, the flow continues at block 510.

At block 510, the system performs input-output operations using BIOS code, operating system code, and/or other components (e.g., application programs, hardware devices, etc.). For example, in some embodiments, the system presents wagering games, such as video slots, video poker, video black jack, etc.

This discussion continues with a description of operations for using a hardware device to select BIOS configuration options.

FIG. 6 is a flow diagram illustrating operations for detecting BIOS configuration options, according to some embodiments of the inventive subject matter. In FIG. 5, a flow 500 begins at block 502, where a computer system performs power-up operations as part of an initialization process. The flow continues at block 604.

At block 604, under control of the BIOS 314, the processor 308 detects a signal indicating BIOS configuration options, wherein the signal originates from the hardware configuration module 320. In other embodiments, the processor 308 reads data from a register in the hardware configuration module 320, where the data indicates one or more BIOS configuration options. In yet other embodiments, the hardware configuration module 320 writes data to a register in the processor 308, where the data indicates one or more BIOS configuration options. The BIOS configuration options can include any configurable option available in the BIOS 314. Such configurable BIOS options include setting a primary display adapter, secondary display adapter, designating a boot device, etc. Flow continues at block 606.

At block 606, under control of the BIOS 314, the processor 308 initializes input output devices, such as keyboards, pointing devices, button panels, storage drives, etc. After the input output devices are initialized, they are available for use by the system 300.

At block 608, after initializing the I/O devices, the system launches an operating system from a boot device. For example, under control of the BIOS 314, the processor 308 begins loading and executing an operating system from a boot device. From block 608, the flow continues at block 610.

At block 610, the system performs input-output operations using BIOS code, operating system code, and/or other components (e.g., application programs, hardware devices, etc.). For example, in some embodiments, the system present wagering games, such as slots, video poker, video black jack, etc.

Some embodiments of the inventive subject matter include BIOS capable of identifying hardware components, as well as detecting configuration options based on input from a hardware configuration device. However, other embodiments may not include all such functionality. Furthermore, although some embodiments of the inventive subject matter reside in wagering game machines, other embodiments do not. For example, some embodiments may reside in general-purpose computer systems, embedded systems, etc.

Example Wagering Game Machines

Figure 7:
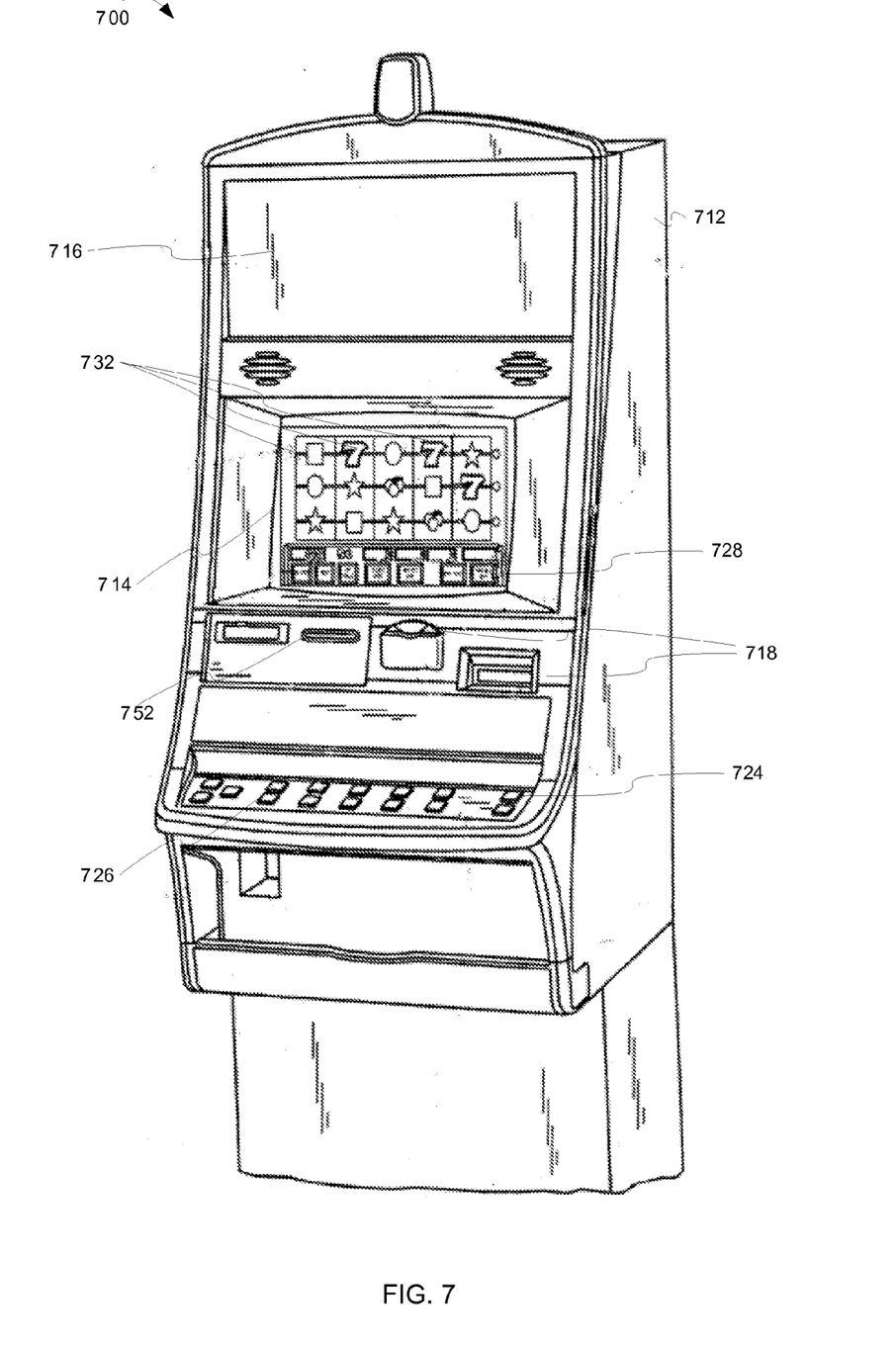
FIG. 7 is a perspective view of a wagering game machine, according to example embodiments of the invention.

FIG. 7 is a perspective view of a wagering game machine, according to example embodiments of the invention. Referring to FIG. 7, a wagering game machine 600 is used in gaming establishments, such as casinos. According to embodiments, the wagering game machine 700 can be any type of wagering game machine and can have varying structures and methods of operation. For example, the wagering game machine 700 can be an electromechanical wagering game machine configured to play mechanical slots, or it can be an electronic wagering game machine configured to play video casino games, such as blackjack, slots, keno, poker, blackjack, roulette, etc.

The wagering game machine 700 comprises a housing 712 and includes input devices, including value input devices 718 and a player input device 724. For output, the wagering game machine 700 includes a primary display 714 for displaying information about a basic wagering game. The primary display 714 can also display information about a bonus wagering game and a progressive wagering game. The wagering game machine 700 also includes a secondary display 716 for displaying wagering game events, wagering game outcomes, and/or signage information. The wagering game machine 700 can also include one or more of the components described in FIGS. 1-3, and it can perform operations described in FIGS. 4-5. While some components of the wagering game machine 700 are described herein, numerous other elements can exist and can be used in any number or combination to create varying forms of the wagering game machine 700.

The value input devices 718 can take any suitable form and can be located on the front of the housing 712. The value input devices 718 can receive currency and/or credits inserted by a player. The value input devices 718 can include coin acceptors for receiving coin currency and bill acceptors for receiving paper currency. Furthermore, the value input devices 718 can include ticket readers or barcode scanners for reading information stored on vouchers, cards, or other tangible portable storage devices. The vouchers or cards can authorize access to central accounts, which can transfer money to the wagering game machine 700.

The player input device 724 comprises a plurality of push buttons on a button panel 726 for operating the wagering game machine 700. In addition, or alternatively, the player input device 724 can comprise a touch screen 728 mounted over the primary display 714 and/or secondary display 716.

The various components of the wagering game machine 700 can be connected directly to, or contained within, the housing 712. Alternatively, some of the wagering game machine's components can be located outside of the housing 712, while being communicatively coupled with the wagering game machine 700 using any suitable wired or wireless communication technology.

The operation of the basic wagering game can be displayed to the player on the primary display 714. The primary display 714 can also display a bonus game associated with the basic wagering game. The primary display 714 can include a cathode ray tube (CRT), a high resolution liquid crystal display (LCD), a plasma display, light emitting diodes (LEDs), or any other type of display suitable for use in the wagering game machine 700. Alternatively, the primary display 714 can include a number of mechanical reels to display the outcome. In FIG. 7, the wagering game machine 700 is an "upright" version in which the primary display 714 is oriented vertically relative to the player. Alternatively, the wagering game machine can be a "slant-top" version in which the primary display 714 is slanted at about a thirty-degree angle toward the player of the wagering game machine 700. In yet another embodiment, the wagering game machine 700 can exhibit any suitable form factor, such as a free standing model, bartop model, mobile handheld model, or workstation console model.

A player begins playing a basic wagering game by making a wager via the value input device 718. The player can initiate play by using the player input device's buttons or touch screen 728. The basic game can include arranging a plurality of symbols along a payline 732, which indicates one or more outcomes of the basic game. Such outcomes can be randomly selected in response to player input. At least one of the outcomes, which can include any variation or combination of symbols, can trigger a bonus game.

In some embodiments, the wagering game machine 700 can also include an information reader 752, which can include a card reader, ticket reader, bar code scanner, RFID transceiver, or computer readable storage medium interface. In some embodiments, the information reader 752 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method for configuring a wagering game machine including a basic input/output system (BIOS), the method comprising:
    initializing a processor and chipset residing on an embedded computer module residing in the wagering game machine, wherein the BIOS is a unitary component including code capable of configuring each of a plurality of embedded computer modules, and wherein the BIOS resides on a carrier board connected to the embedded computer module;
    reading configuration information from a memory device onboard the embedded computer module;
    identifying, by the BIOS based on the configuration information, the embedded computer module as a particular one of the plurality of embedded computer modules;
    initializing, by the BIOS, input/output devices connected to the carrier board and the embedded computer module, wherein the initializing includes,
        determining results for conditional statements in the code; based on the configuration information;
        selecting, based on the results, one or more subroutines in the code, wherein the subroutines are configured to initialize the input/output devices;
    launching, under control of the BIOS, an operating system in the wagering game machine;
    presenting a wagering game on the wagering game machine, wherein the presenting utilizes information received from the input/output devices.

2. The method of claim 1, wherein the embedded computer module conforms to a Computer-On-Module Express standard.

3. The method of claim 1, wherein the identifying includes:
    reading configuration information from an electrically erasable programmable read only memory device residing on the embedded computer module, wherein the configuration information identifies the embedded computer module.

4. The method of claim 1 further comprising:
    detecting a signal indicating a group of one or more BIOS configuration options, where the group of BIOS configuration options indicates a configuration for one or more of the input/output devices, wherein the signal originates from a hardware component residing on the carrier board.

5. The method of claim 4 wherein the initializing the input/output devices is based on the group of BIOS configuration options.

6. A method for initializing a wagering game machine, the method comprising:
    launching, by an embedded computer module of the wagering game machine, a unitary BIOS capable of configuring input/output devices of a plurality of different embedded computer modules;
    detecting an indication of BIOS configuration options, wherein the indication originates from a configuration module residing on the embedded computer module, and wherein the BIOS configuration options identify the embedded computer module as a particular one of the plurality of different embedded computer modules;
    initializing, under control of the unitary BIOS, the input/output devices of the embedded computer module based on the BIOS configuration options, wherein the initializing includes
    determining results of conditional statements in code of the unitary BIOS:
        selecting, based on the results, one or more subroutines in the code to initialize the embedded computer module;
launching an operating system using one or more of the input/output devices;
presenting a wagering game utilizing one or more of the input/output devices.

7. The method of claim 6, wherein the indication of BIOS configuration options is a signal originating from the configuration module.

8. The method of claim 7, wherein the configuration module produces the signal based, at least in part, on presence of a hardware strap residing on the configuration module.

9. The method of claim 6, wherein the indication is a value written to a register of a processor residing on the embedded computer module.

10. The method of claim 6, wherein the indication is a value written to a register residing in the configuration module.

11. An wagering game machine comprising:
    a carrier board including a nonvolatile memory device, wherein the nonvolatile memory device includes a unitary basic input/output system (BIOS) code for initializing devices of a plurality of different Computer-On-Module (COMe) modules;
    a COMe module of the plurality of different COMe modules, wherein the COMe module including,
        a nonvolatile memory device including configuration information distinguishing the COMe module from a plurality of different COMe modules;
        a processor configured to
            execute the BIOS code, wherein execution of the BIOS code includes execution of instructions to access the configuration information; and
            evaluating, based on the configuration information, conditional statements in the unitary BIOS code to activate code configured to initialize the COMe module; and
            initialize the COMe module using the code configured to initialize the COMe module;
        execute wagering game code for presentation of wagering games on the wagering game machine.

12. The wagering game machine of claim 11, wherein the carrier board includes a hardware device configured to provide a signal indicating user configurable BIOS options, and wherein the BIOS code is further configured to detect the signal and configure, based on the user configurable BIOS options, input/output devices of the wagering game machine.

13. The wagering game machine of claim 11, wherein the carrier board includes a hardware device configured to indicate user selectable BIOS options based on one or more of presence of a hardware jumper and settings of switches.

14. The wagering game machine of claim 11, wherein the configuration information includes one or more of a COMe module type, COMe module serial number, COMe module part number, and COMe option indicator.

15. The wagering game machine of claim 11, wherein the BIOS code includes different code portions for each of the plurality of COMe modules.

16. A method for initializing a wagering game machine, the method comprising:
    initializing, under control of a unitary basic input output system (BIOS), a processor and chipset residing on an embedded computer module residing in the wagering game machine;
    identifying, under control of code in the unitary BIOS, a component residing in the wagering game machine, wherein the component can be one of a plurality of models, and wherein the unitary BIOS includes code for configuring each of the plurality models;
    initializing, using code of the unitary BIOS configured for the particular one of the plurality of models, the component, wherein the initializing includes determining results of conditional statements in code of the unitary BIOS: selecting, based on the results, one or more subroutines in the code to initialize the component;
    launching, under control of the unitary BIOS, an operating system in the wagering game machine;
    presenting a wagering game on the wagering game machine, wherein the presenting utilizes information received from input/output devices.

17. The method of claim 16, wherein the component is selected from embedded computer module, carrier board, and peripheral device.

18. The method of claim 16, wherein the identifying includes:
    reading configuration information from an electrically erasable programmable read only memory device residing on the embedded computer module, wherein the configuration information identifies the model of the component.

19. The method of claim 16 further comprising:
    detecting a signal indicating a group of one or more BIOS configuration options, where the group of BIOS configuration options indicates a configuration for one or more input/output devices in the wagering game machine, wherein the signal originates from a hardware component residing on the carrier board.

20. The method of claim 19 wherein the initializing the input/output devices is based on the group of BIOS configuration options.

* * * * *